3,413,100
PROCESS FOR THE PRODUCTION OF AlSCl
Gilbert S. Layne, Midland, Mich., assignor to The Dow Chemical Company, Midland, Mich., a corporation of Delaware
No Drawing. Filed June 9, 1967, Ser. No. 644,785
3 Claims. (Cl. 23—367)

ABSTRACT OF THE DISCLOSURE

This invention relates to a new compound, AlSCl, and to its preparation which is accomplished by reacting gaseous aluminum chloride with solid particulate aluminum sulfide at high temperatures in an inert atmosphere to produce gaseous AlSCl which is recovered by cooling to form the solid AlSCl.

SUMMARY OF THE INVENTION

This invention relates to a new compound, AlSCl, and to its preparation by the high temperatures reaction of aluminum chloride ($AlCl_3$) and aluminum sulfide ($Al_2S_3$) in an inert atmosphere. The AlSCl product is an effective antipersonnel agent since, when contacted with the moisture of the air, it hydrolyzes to produce gaseous HCl and $H_2S$. It is likewise useful as a highly reactive intermediate having reactivity similar to that of $AlCl_3$.

It is an object of this invention to provide the art with a new highly reactive compound, AlSCl. A further object is to provide a method for the preparation of AlSCl. These and other objects and advantages of the present process will become apparent from a reading of the following detailed description.

DESCRIPTION OF THE PREFERRED EMBODIMENTS

The new composition of this disclosure has the empirical formula AlSCl and is referred to herein by such formula. It should be recognized, however, that such composition may actually exist as $(AlSCl)_n$ wherein $n$ is a whole number. This compound is a white solid which, if slowly heated to temperatures up to about 500° C., will disproportionate to $AlCl_3$ and $Al_2S_3$. Upon contact with water vapor, AlSCl rapidly hydrolyzes to form hydrated $Al_2O_3$ and to release gaseous HCl and $H_2S$. This characteristic makes AlSCl useful as an antipersonnel agent.

According to the process of this invention, AlSCl is prepared by reacting aluminum chloride and aluminum sulfide at a temperature of between about 750 and 1000° C. The AlSCl passes overhead as a gas and is usually combined with some of the $AlCl_3$ reactant. Such gas is then cooled and the AlSCl is collected as a powdered solid product. Since AlSCl has a condensation temperature significantly above that of $AlCl_3$, the gases may be separated by selective cooling. In a preferred embodiment of the invention, $AlCl_3$ is placed in the bottom of the reaction vessel and heated to pass as a gas through a porous bed of particulate $Al_2S_3$ located above the $AlCl_3$ in the reaction vessel. A major proportion of the $AlCl_3$ vapor reacts with the $Al_2S_3$ upon contact to produce AlSCl which passes overhead as a gas to the condensation zone having a temperature of between about 225° C. and about 600° C.

The contact time required between $AlCl_3$ and $Al_2S_3$ depends to a large extent upon the temperature at which the reaction is taking place. In general, however, a contact time of between about 1 and about 30 minutes is adequate.

Due to the high degree of reactivity of both the reactants and the product of this reaction, it is essential that the reaction system be inert to such reactants and product. The exclusion of oxygen and moisture is particularly necessary.

The following examples are provided to further illustrate the invention but are not to be construed as limiting to the scope thereof.

Example 1

In a Vycor cylinder reactor, 71 gm. of aluminum sulfide was placed on a pad of quartz wool suspended above 231 gm. of aluminum chloride. The zone containing the $AlCl_3$, the zone containing the $Al_2S_3$ and a third zone for condensation were each independently temperature controlled by heating in individual tube furnaces. The bottom of the Vycor tube was sealed and the upper end was attached to a manifold which maintained a dry argon atmosphere within the system.

The $Al_2S_3$ zone was heated to 850° C., the condensation zone was heated to 400° C. and these zones were maintained at such temperatures throughout the experiment. After these two zones had stabilized in temperature, the lower $AlCl_3$ zone was gradually heated to 400° C. over a period of 13 hours. At the end of this period, the Vycor reactor tube was allowed to cool and 31 gm. of a white powdery solid was recovered from the condensation zone. The residual $Al_2S_3$ was found to weigh 48.4 gm. Neutron activation analysis showed the product to have the empirical formula AlSCl and X-ray diffraction analysis showed little or no $AlCl_3$ or $Al_2S_3$ to be present.

A small sample of the product was removed from an argon atmosphere and exposed to room temperature. It was found to give off HCl and $H_2S$ over a period of about 3 hours.

Example 2

In a manner similar to Example 1, gaseous $AlCl_3$ was passed through a layer of coarse (about 10 mesh) $Al_2S_3$ granules supported on a quartz frit and maintained at 900° C. The AlSCl produced and the unreacted $AlCl_3$ then passed through a zone filled with graphite felt and into a zone maintained at about 500° C. where the AlSCl condensed. The unreacted $AlCl_3$ passed through this zone and was subsequently condensed in a second condensing zone having a temperature of about 180° C.

Elemental determination of the product showed it to have an empirical formula of AlSCl and X-ray diffraction analysis revealed that no $AlCl_3$ or $Al_2S_3$ was present.

Various modifications can be made in the present invention without departing from the spirit or scope thereof for it is understood that I limit myself only as defined in the appended claims.

I claim:
1. A process for the production of AlSCl which comprises reacting aluminum chloride with aluminum sulfide in an inert atmosphere and at a temperature of between about 750° C. and 1000° C. to produce gaseous AlSCl.
2. The process according to claim 1 wherein the gaseous AlSCl is cooled and recovered as a solid product.
3. The process according to claim 1 wherein the $AlCl_3$ is passed as a gas through a bed of $Al_2S_3$ and the AlSCl product is selectively condensed at a temperature of between about 225 and about 600° C.

References Cited

Pascal: Nouveau Traité de Chimie Minérale, vol. VI (1961), pp. 545–546, Masson et Cie, Editeurs, Paris.

OSCAR R. VERTIZ, *Primary Examiner.*

H. S. MILLER, *Assistant Examiner.*